Sept. 16, 1947.  A. GAGESTEYN  2,427,353
CLAMPING TOOL
Filed Feb. 21, 1946
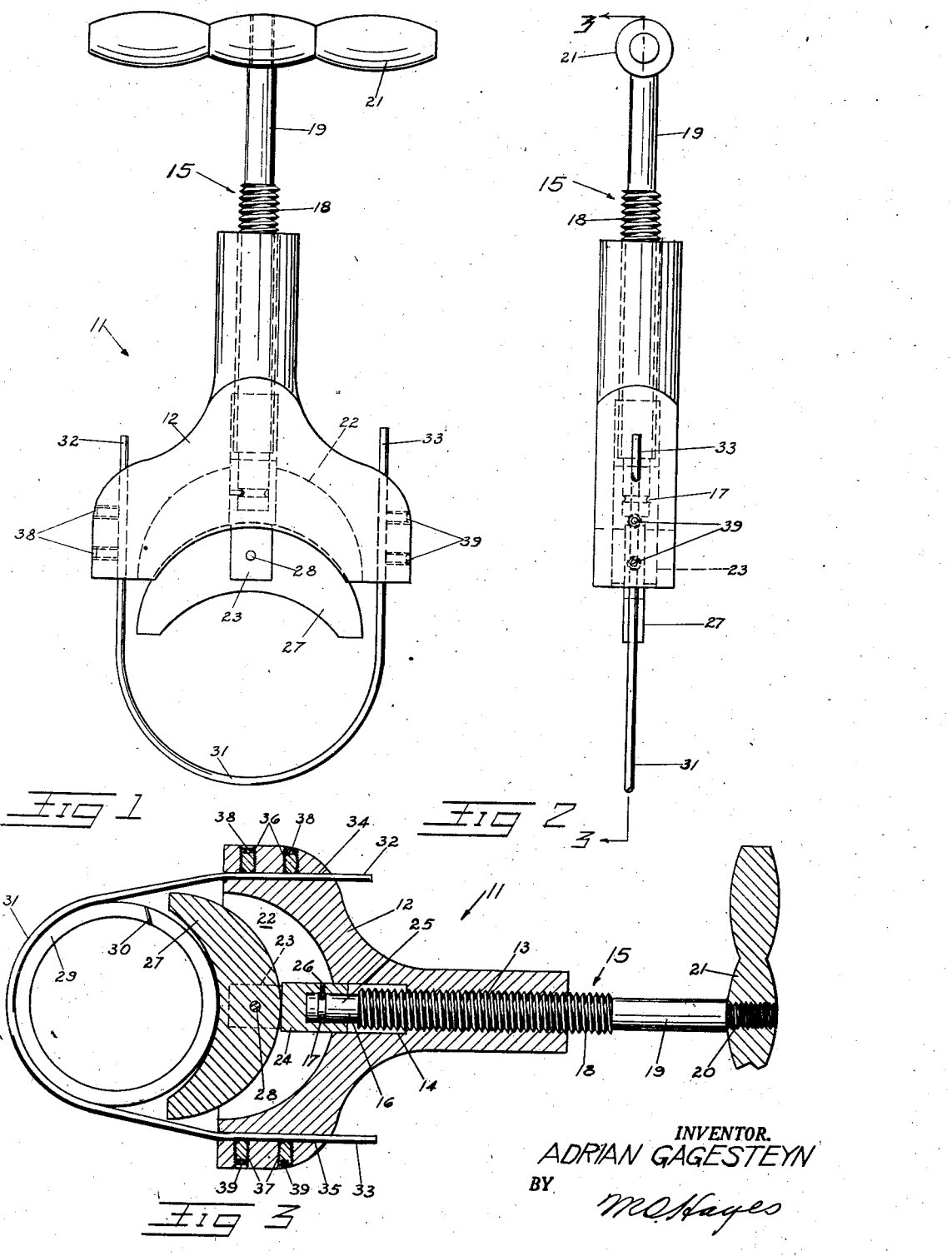
INVENTOR.
ADRIAN GAGESTEYN
BY
M. O. Hayes
ATTORNEY Patented Sept. 16, 1947

2,427,353

UNITED STATES PATENT OFFICE 2,427,353

CLAMPING TOOL

Adrian Gagesteyn, Jersey City, N. J.

Application February 21, 1946, Serial No. 649,434

1 Claim. (Cl. 29—222)

(Granted under the act of March 3, 1883, as amended April 30, 1928; 370 O. G. 757)

This invention relates to a clamping tool and more particularly to a clamping tool adapted for closing split piston rings which are to be mounted on a spud and re-turned on an engine lathe.

In re-turning a split piston ring on an engine lathe, the ring is mounted on a spud which is held in a chuck. After mounting a split ring on a spud, the gap in the ring must be closed leaving a few thousandths of an inch opening. It is common practice to close this gap by using a pair of pliers and a loop of wire. By twisting the wire the gap in the ring is closed. This practice has been found to be cumbersome, expensive, inaccurate and consumptive of much time. The present invention makes it possible to close the gap in a split ring which has to be re-turned in an engine lathe, with extreme accuracy and a substantial saving in time consumed as compared with the present practice.

It is an object of this invention, therefore, to provide a clamping tool for closing the gap in a split piston ring which is to be mounted on a spud and re-turned on an engine lathe.

Another object of this invention is to provide a mechanical device of this character which may be readily adapted for use with different size rings.

A further object of this invention is to provide a mechanical device of this character having means for accurately setting the gap in a split ring before re-turning the ring on an engine lathe.

A still further object of this invention is to provide a mechanical device of this character for holding or compressing any substantially circular or elliptical shaped members.

Further objects and advantages of this invention, as well as its construction, arrangement and operation will be apparent from the following description and claim, in connection with the accompanying drawings, in which, Figure 1 is a front elevation of the tool embodying this invention, Figure 2 is a side elevation of the tool of Figure 1, and, Figure 3 is a vertical sectional view taken through line 3—3 of Figure 2 showing the general assembly and construction of the tool.

Referring to the drawings in detail, a preferred form of the invention is shown in the figures wherein the clamping tool 11 has a substantially Y-shaped body 12 which is provided with a bore extending axially through the stem of the Y-shaped body and having a threaded bore portion 13 at one end, and a slightly enlarged bore portion 14 at the other end. A spindle 15 threadedly engaged in threaded bore portion 13 has a straight portion 16 with an annular groove 17, a slightly enlarged threaded portion 18, a straight portion 19 and a slightly reduced threaded portion 20 as shown in Figure 3. A conventional handle 21 is threadedly engaged with the slightly reduced threaded portion 20 of spindle 15.

Body 12 is cut out to form a semi-circular recess 22. A bifurcated member 23 having a cylindrical portion 24 slidably engaged in the enlarged bore portion 14 of body 12 is provided with a bore 25 to rotatably engage with straight portion 16 of spindle 15. To prevent the straight portion 16 of spindle 15 from moving axially within bore 25 of the bifurcated member 23 a set screw 26 is provided which passes through a threaded hole in the cylindrical portion 24 and engages the annular groove 17. As shown in Figure 3 the bifurcated member 23 is rigidly attached to compression member 27 by a rivet 28 or other suitable means.

Compression member 27, a substantially semi-circular shaped member having an arcuate bottom edge to compress a split piston ring 29 with gap 30, is slidably mounted in the semi-circular recess 22 of body 12.

Bearing against the split piston ring 29 is a loop of spring wire 31 having ends 32 and 33 slidably engaged in small diameter bores 34 and 35 in each arm of the Y-shaped body 12 as shown in Figure 3. A pair of threaded bolt holes 36 and 37 in each arm of the Y-shaped body 12 threadedly engage a pair of socket set screws 38 and 39 which rigidly hold the ends 32 and 33 of spring wire 31 in bores 34 and 35 of body 12.

In the operation of the device a split piston ring 29 which has to have its outer periphery re-turned is mounted on a spud which is held in a chuck of an engine lathe. To properly machine the outer periphery to the required diameter the gap 30 in the split piston ring 29 must be almost closed leaving a few thousandths of an inch opening.

The spring wire 31 is slackened off at either end 32 or 33 by withdrawing socket set screws 38 or 39 within the threaded bores 36 and 37. The spring wire 31 having this adjustable feature for different size diameters is then placed around the periphery of the split ring 30. When the adjustment for the proper size has been made the socket set screws 38 and 39 are tightened holding the ends 32 and 33 of spring wire 31 rigid in the small diameter bores 34 and 35 in body 12. To accurately set the size opening in the gap 30 of the split piston ring 29 a shim of the desired thickness is placed therein.

As can be seen in Figure 3 by turning handle 21 compression member 27 moves outwardly compressing the split ring 29 against the spring wire 31 which will close the gap 30 in the ring 29.

When the gap 30 in the split ring 29 is almost closed and the desired opening obtained, the ring is placed on a spud, a washer is mounted on the spud alongside of the ring and a nut on the end of the spud clamps the washer and split ring against a shoulder on the spud. The clamping tool 11 is then loosened and removed, leaving the split ring 29 clamped on the spud for machining the periphery.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A clamping tool comprising a Y-shaped body, an arcuate recess between the arms of said body, a bore extending through said body, said bore having a threaded portion extending axially through the stem of said body and an enlarged bore portion extending into said recess, a spindle having a handle at one end and a threaded portion engaging said threaded bore, an arcuate compression member slidably mounted in said recess, a substantially cylindrical bifurcated member slidably mounted in said enlarged bore portion, said bifurcated member rotatably engaging the other end of said spindle and being attached at its bifurcated end to said compression member, a loop having its ends slidably mounted in the arms of said body and means for clamping the ends of said loop in said arms.

ADRIAN GAGESTEYN.

REFERENCES CITED

The following references are of record in the file of this patent:

UNITED STATES PATENTS

| Number | Name | Date |
|---|---|---|
| 575,694 | Burnes | Jan. 26, 1897 |
| 1,505,017 | Fornelius | Aug. 12, 1924 |

FOREIGN PATENTS

| Number | Country | Date |
|---|---|---|
| 523,754 | France | Apr. 28, 1921 |